United States Patent [19]

Grant

[11] Patent Number: 4,555,342
[45] Date of Patent: Nov. 26, 1985

[54] RIBBON FILTER APPARATUS

[76] Inventor: Blake F. Grant, Rte. 1, Box 264A, Hagerman, Id. 83332

[21] Appl. No.: 598,172

[22] Filed: Apr. 9, 1984

Related U.S. Application Data

[63] Continuation-in-part of Ser. No. 393,183, Jun. 28, 1982, abandoned.

[51] Int. Cl.⁴ .......................................... B01D 25/04
[52] U.S. Cl. ................................. 210/488; 210/493.1; 210/493.4; 210/497.1; 55/521; 55/498; 55/500; 55/485; 55/486
[58] Field of Search ............... 210/106, 354, 356, 409, 210/437, 438, 440, 443, 483, 488, 493.1, 493.4, 493.5, 497.01, 497.1, 497.2, 500.1, 501, 506, 439; 55/524, 521, 497, 498, 500, 490, 485, 486

[56] References Cited

U.S. PATENT DOCUMENTS

| | | | |
|---|---|---|---|
| 2,409,951 | 10/1946 | Nootens | 428/182 |
| 2,915,426 | 12/1959 | Poelman | 156/295 |
| 3,020,977 | 2/1962 | Huppke et al. | 156/292 |
| 3,037,637 | 6/1962 | Bub | 210/493.4 |
| 3,348,695 | 10/1967 | Rosaen | 210/493.5 |
| 3,674,620 | 7/1972 | McCarthy et al. | 428/182 |
| 3,679,537 | 7/1972 | Huer et al. | 156/205 |
| 3,794,179 | 2/1974 | Doucet | 210/409 |
| 3,801,419 | 4/1974 | Meek | 428/182 |
| 3,867,294 | 2/1975 | Pall et al. | 210/493.5 |
| 4,008,060 | 2/1977 | Andreae | 55/486 |
| 4,039,457 | 8/1977 | Schacht et al. | 210/493.4 |
| 4,089,783 | 5/1978 | Holyoak | 210/493.1 |
| 4,137,172 | 1/1979 | Sako et al. | 210/150 |
| 4,154,688 | 5/1979 | Pall | 210/493.1 |
| 4,172,797 | 10/1979 | Robichaud et al. | 210/493.1 |
| 4,178,248 | 12/1979 | Porter et al. | 210/409 |
| 4,228,847 | 10/1980 | Lindahl | 156/205 |
| 4,333,779 | 6/1982 | Rinker et al. | 156/292 |
| 4,345,997 | 8/1982 | McConnell, Jr. et al. | 210/150 |
| 4,419,241 | 12/1983 | Hoffman | 210/493.5 |

Primary Examiner—Richard V. Fisher
Assistant Examiner—Wanda L. Millard
Attorney, Agent, or Firm—Dunlap, Codding & peterson

[57] ABSTRACT

A filtration module formed from a first flexible sheet having a first edge section, an opposed second edge section and an interior section, comprising engaging each portion of the first and second edge sections respectively to uncorrugated first upper and lower terminal elements. Corrugations are formed in the first upper and lower terminal elements of the first flexible sheet-terminal elements assembly, and slits are cut in the interior section of the first flexible sheet-terminal elements assembly, with the slits extending transversely to the edge sections. Each adjacent pair of slits in the interior section defines a ribbon element. One or more filtration modules may be assembled to form a filter by stacking the elements or by winding the filtration module or modules around a central core. The stacked or wound filtration modules are supported within a housing so that each ribbon element is disposed in a fully extended, fexible state.

16 Claims, 9 Drawing Figures

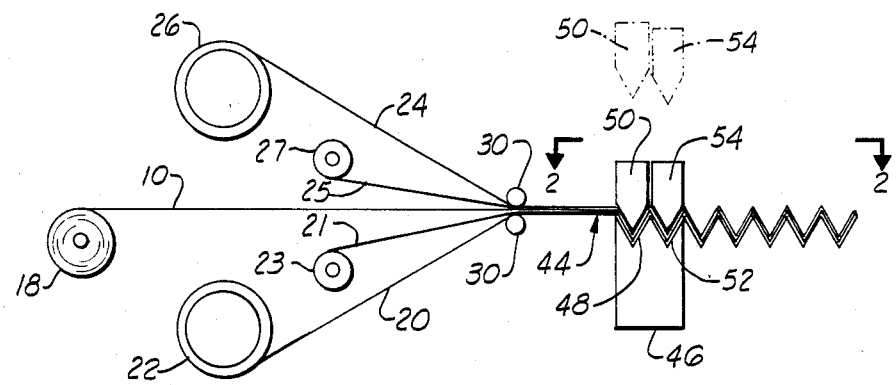
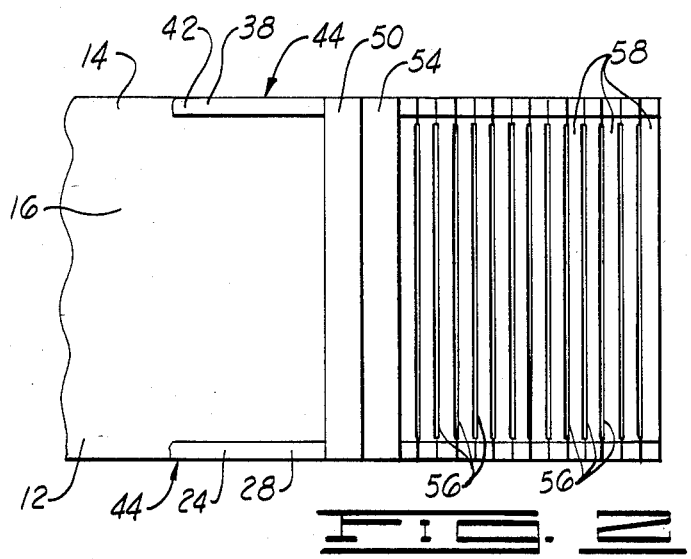
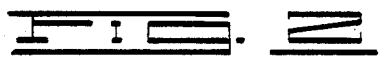
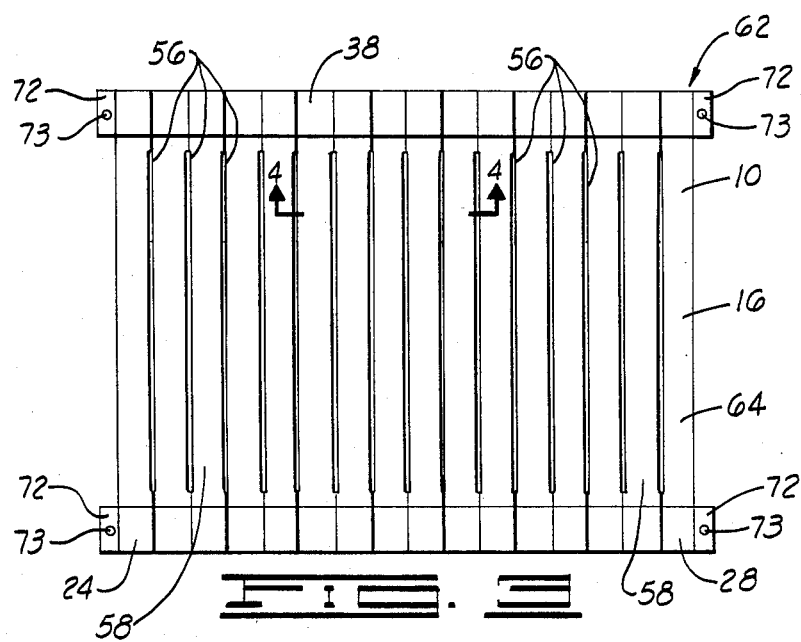

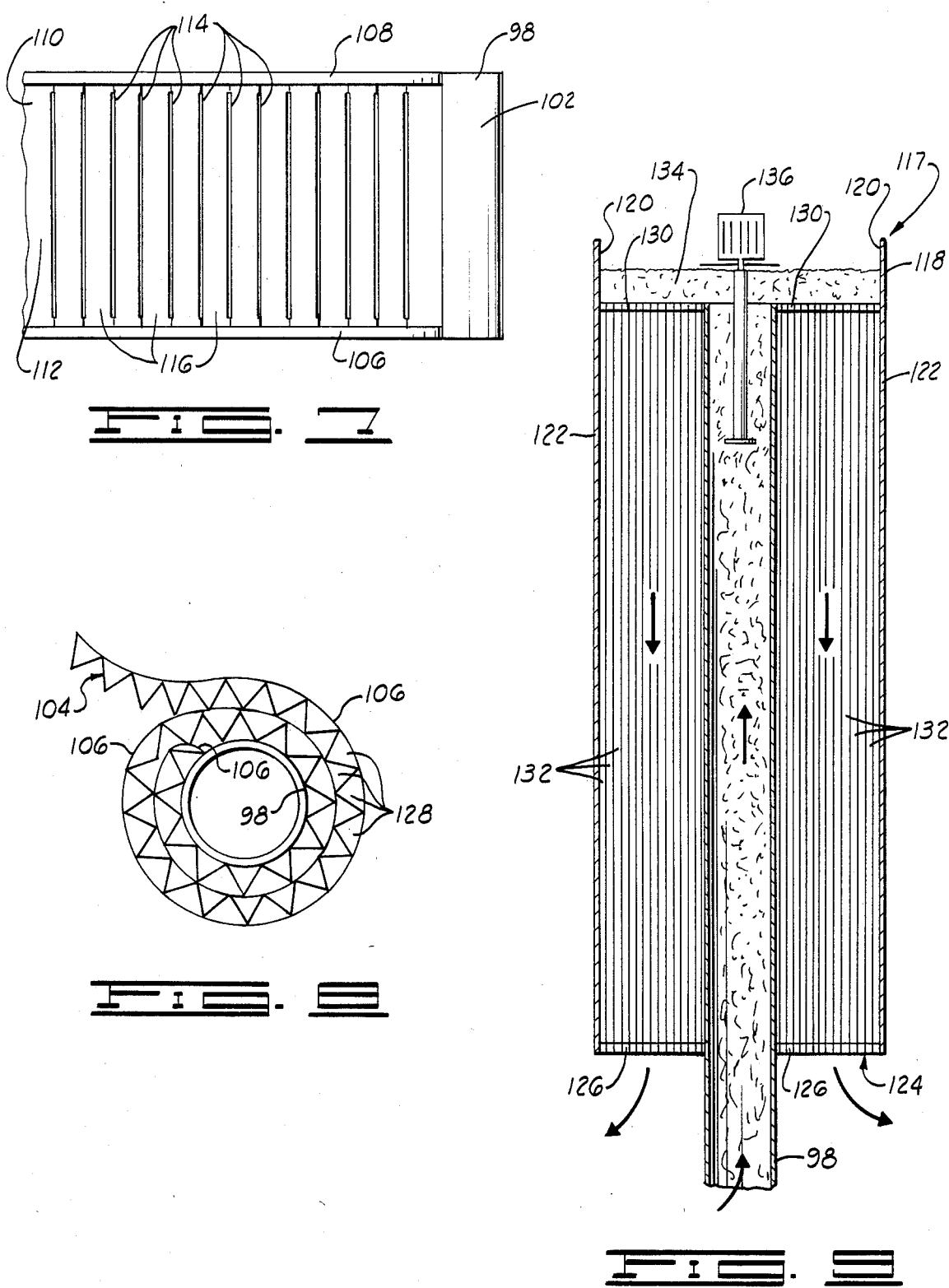

RIBBON FILTER APPARATUS

CROSS-REFERENCE TO RELATED APPLICATION

This application is a continuation-in-part of U.S. patent application Ser. No. 393,183, filed June 28, 1982, now abandoned.

FIELD OF THE INVENTION

The present invention relates generally to filtration media, and to methods for assembling filtration media.

SUMMARY OF THE INVENTION

A method of assembling a filtration module from a first flexible sheet having a first edge section, an opposed second edge section and an interior section, comprising engaging each portion of the first and second edge sections respectively to uncorrugated first upper and lower terminal elements. Corrugations are formed in the first upper and lower terminal elements of the first flexible sheet-terminal elements assembly, and slits are cut in the interior section of the first flexible sheet-terminal elements assembly, with the slits extending transversely to the edge sections. Each adjacent pair of slits in the interior section defines a ribbon element. To form a filter, at least one filtration module is supported within a housing, and each ribbon element is disposed in a fully extended, flexible state.

BRIEF DESCRIPTION OF THE DRAWINGS

FIG. 1 is a semi-schematic side elevational view showing the method of assembly of a filtration module of the present invention.

FIG. 2 is a plan view, showing the method of assembly of a filtration module, taken along line 2—2 of FIG. 1. The terminal elements have been partially cut away to permit better display of other components of the invention.

FIG. 3 is a plan view of an assembled filtration module of the present invention.

FIG. 7 is a plan view of the method of assembly shown in FIG. 6.

FIG. 8 is a semi-schematic cross-sectional side view showing a filter of the type shown in FIGS. 6 and 7 during a later stage of the filter assembly process.

FIG. 9 is a cross-sectional view of an installed filter of the type shown in FIGS. 6, 7 and 8.

DESCRIPTION OF THE PREFERRED EMBODIMENTS

Figure 4:
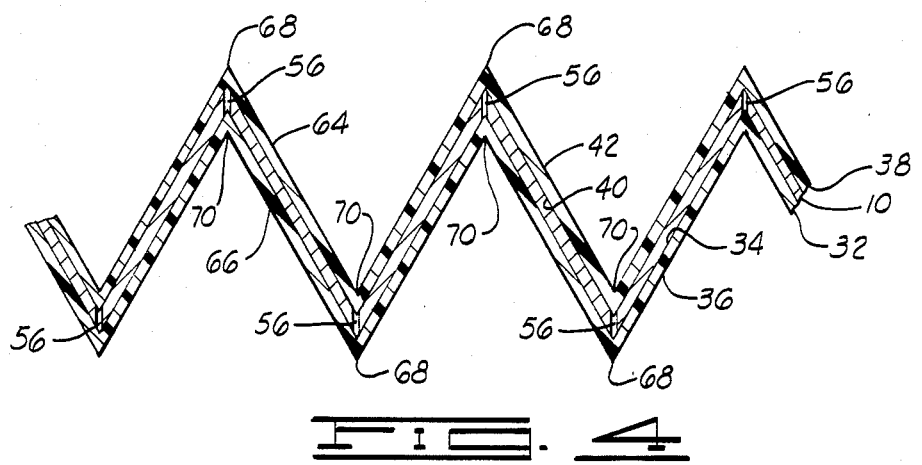
FIG. 4 is a cross-sectional view of an assembled filtration module taken along line 4—4 of FIG. 3.

With reference to FIGS. 1 and 2, at least a portion of a first flexible sheet 10 is positioned in a planar orientation. The first flexible sheet 10 preferably is rectangular in shape, and is characterized by a first edge section 12, and an opposed second edge section 14. Intermediate to the first and second edge sections 12 and 14 is an intermediate section 16. The first flexible sheet 10 preferably is formed from a thin, lightweight, inert material, such as a polyester or other plastic, which is suitable for growth of a bacterial layer. The first flexible sheet more preferably comprises Mylar, which most preferably is no more than 0.002 inches thick. The first flexible sheet 10 may be rolled onto a spool 18, and may be dispensed from the cylinder 18 as the spool 18 is rotated.

An uncorrugated first lower terminal element 20 is brought into engagement with the one side of the flexible sheet 10. The first lower terminal element 20 preferably comprises an elongate strip of a strong, corrugatable material, such as thin stainless steel, a polyamide such as nylon, or fiberglass-reinforced plastic. Much like the first flexible sheet 10, the first lower terminal element 20 may be rolled onto a spool 22, and may be drawn from the spool 22 as required. The first lower terminal element 20 is characterized by a first surface (not shown) disposed adjacent the first flexible sheet 10, and an opposed second surface (not shown).

With continued reference to FIGS. 1 and 2, the first lower terminal element 20 is positioned such that each portion of the first edge section 12 is disposed in surface-to-surface engagement with the first surface of the first lower terminal element 20. Engagement between the first lower terminal element 20 and the first edge section 12 is maintained by a first lower retaining element 21, which preferably comprises a layer of adhesive material which may be drawn from a spool 23 as required. Alternately, engagement between the first lower terminal element 20 and the first edge section 12 may be established and maintained by mechanical compression fittings, thermal binding, or fluid waterproof contact adhesive.

An uncorrugated second lower terminal element 24, preferably identical to the first lower terminal element, preferably is brought into engagement with the side of the first flexible sheet 10 opposite the first lower terminal element 20. Like the first terminal element 20, the second lower terminal element 24 may be rolled onto a spool 26, and may be drawn from the spool 26 as required. The second lower terminal element 24 is characterized by a first surface (not shown), disposed adjacent the first flexible sheet 10, and an opposed second surface 28.

The second lower terminal element 24 is positioned such that each portion of the first edge section 12 is disposed in surface-to-surface engagement with the first surface of the second lower terminal element 24. Engagement between the second lower terminal element 24 and the first edge section 12 is maintained by a second lower retaining element 25, which preferably comprises a layer of adhesive material which may be drawn from a spool 27 as required. Alternately, engagement between the second lower terminal element 24 and the first edge section 12 may be established and maintained by mechanical compression fittings, thermal binding, or fluid waterproof contact adhesive.

As shown in FIG. 1, when the first flexible sheet 10 and first and second lower terminal elements 20 and 24 are assembled as just described, the first edge section 12 is laminated between the first surfaces of the first and second lower terminal elements 20 and 24. The first flexible sheetlower terminal elements assembly may be drawn through a pair of adjacent rollers 30, in order to establish complete surface-to-surface engagement between each lower terminal element and the first flexible sheet 10.

With reference to FIGS. 1, 2, and 4, the present invention further comprises an uncorrugated first upper terminal element 32, which preferably is identical to the first and second lower terminal elements 20 and 24. Like the first and second lower terminal elements 20 and 24, the first upper terminal element 32 may be rolled onto a spool (not shown), and thereafter may be drawn from the spool as required. In some instances, it may be possible to roll both the first lower terminal element 20 and the first upper terminal element 32 onto the same spool. The first upper terminal element 32 is characterized by a first surface 34 disposed adjacent the first flexible sheet 10, and an opposed second surface 36.

The first upper terminal element 32 is brought into engagement with the side of the first flexible sheet 10 adjacent the first lower terminal element 20. The first upper terminal element 32 is positioned such that each portion of the second edge section 14 is disposed in surface-to-surface engagement with the first surface 34 of the first upper terminal element 32. Engagement between the first upper terminal element 32 and the second edge section 14 is maintained by a first upper retaining element (not shown), which preferably comprises a layer of adhesive material, mechanical compression fittings, or a fluid waterproof contact adhesive. Alternately, engagement between the first upper terminal element 32 and the second edge section 14 may be established and maintained by thermal binding.

As shown in FIGS. 2 and 4, the present invention further comprises an uncorrugated second upper terminal element 38, which preferably is identical to the first and second lower terminal elements 20 and 24 and the first upper terminal element 32. Like the terminal elements 20, 24 and 32, the second upper terminal element 38 may be rolled onto a spool (not shown), and thereafter may be drawn from the spool as required. In some instances, it may be possible to roll both the second lower terminal element 24 and the second upper terminal element 38 onto the same spool. The second upper terminal element 38 is characterized by a first surface 40, disposed adjacent the first flexible sheet 10, and an opposed second surface 42.

The second upper terminal element 38 is brought into engagement with the side of the first flexible sheet 10 opposite the first upper terminal element 32. The second upper terminal element 38 is positioned such that each portion of the second edge section 14 is disposed in surface-to-surface engagement with the first surface 40 of the second upper terminal element 38. Engagement between the second upper terminal element 38 and the second edge section 14 is maintained by a second upper retaining element (not shown), which preferably comprises an adhesive layer, mechanical compression fittings, or a fluid waterproof contact adhesive. Alternately, engagement between the second upper terminal element 38 and the second edge section 14 may be established and maintained by thermal binding.

When contact between the edge sections of the first flexible sheet 10 and the terminal elements is maintained by thermal binding, the terminal element-first flexible sheet 10 contact may be reinforced by embossing or perforating the edge sections, so that the upper and lower terminal elements fuse to each other as well as to the edge sections.

As shown in FIG. 4, when the first flexible sheet 10 and the first and second upper terminal elements 32 and 38 are assembled as just described, the second edge section 14 is laminated between the first and second upper terminal elements 32 and 38. The first flexible sheet-upper terminal elements assembly may be drawn through a pair of adjacent rollers (not shown), to establish complete surface-to-surface engagement between each upper terminal element and the first flexible sheet 10. In some instances, it may be possible to use the same pair of rollers 30 to simultaneously establish complete surface-to-surface engagement between each of the terminal elements and the first flexible sheet 10.

When the method of the present invention is practiced as a continuous process, the first and second lower terminal elements 20 and 24 are preferably engaged simultaneously to opposite sides of each portion of the first edge section 12. Likewise, in a continuous process, the first and second upper terminal elements 32 and 38 are preferably engaged simultaneously to opposite sides of each portion of the second edge section 18. In such a continuous process, the same rollers 30 preferably simultaneously compress the flexible sheet-terminal elements assembly.

With reference to FIGS. 1 and 2, assembly of the first flexible sheet 10, the first and second lower terminal elements 20 and 24, and the first and second upper terminal elements 32 and 38, as just described, results in a first flexible sheet-terminal elements assembly, which will be generally designated by reference numeral 44. In the first flexible sheet-terminal elements assembly 44, the first flexible sheet 10 is laminated between terminal elements at each edge section 12 and 14. Preferably, the terminal elements 20, 24, 32 and 38 are disposed so as not to obstruct the intermediate section 16 of the flexible sheet 10. As shown in the Figures, the first flexible sheet-terminal elements assembly 44 is substantially planar.

In accordance with the present invention, corrugations are next formed in the first upper and lower terminal elements 20 and 32, and preferably also in the second upper and lower terminal elements 24 and 38. This step is carried out by positioning the first flexible sheet-terminal elements assembly 44 in overlying relationship to a template 46, into which at least one, and preferably a plurality of parallel indentations have been formed. When the first flexible sheet-terminal elements assembly 44 is positioned on template 46, each indentation in the template 46 preferably extends in perpendicular relationship to the first and second edge sections 12 and 14. The template 46 is of sufficient width to permit the entire width of the first flexible sheet-terminal elements assembly 44, from first edge section 12 to second edge section 14, to be accommodated on the template 46.

With reference to FIG. 1, a first section of the first flexible sheet-terminal elements assembly 44 is positioned over a first indentation 48 in the template 46. When the first section of the first flexible sheet-terminal elements assembly 44 is thus positioned, the first section is deformed by a corrugating element 50, which preferably comprises a reciprocating bit which may be moved between a lowered position, shown in solid lines, and a raised position, shown in phantom lines. While the corrugating element 50 is in the raised position, the first flexible sheet-terminal elements assembly 44 may be positioned in preparation for formation of a corrugation. When moved to its lowered position, the corrugating element 50 forms at least one corrugation in the underlying section of the first flexible sheet-terminal elements assembly 44, and more particularly in the terminal elements thereof. The corrugating element 50 forms a corrugation by deforming the underlying terminal elements into a contour which conforms with the underlying first indentation 48 in the template 46.

After a corrugation is formed in a first section of the first flexible sheet-terminal elements assembly 44, the corrugated first section of the first flexible sheet-terminal elements assembly 44 is removed from the first indentation 48, and an uncorrugated second section of the first flexible sheet-terminal elements assembly 44 is placed in overlying relationship to the first indentation 48. A portion of the first flexible sheet-terminal elements assembly 44, and preferably the first section thereof, is placed in overlying relationship to a second indentation 52 in the template 46. The second indentation 52 functions as a restraining site, where the first flexible sheet-terminal elements assembly 44 may be restrained from substantial movement.

Restraint of the first flexible sheet-terminal elements assembly 44 is carried out by lowering a restraining element 54 into the second indentation 52, in overlying, engaging relationship to the first section of the first flexible sheet-terminal elements assembly 44. When the restraining element 54 is thus lowered, the first flexible sheet-terminal elements assembly 44 is brought into restraining engagement with the second indentation 52. The restraining element 54 preferably comprises a reciprocating bit, which may be moved from the lowered position shown in solid lines in FIG. 1, to a raised position shown in phantom lines. When the restraining element 54 is in a raised position, the first flexible sheet-terminal elements assembly 44 is released from restraint, and may be positioned as required. Preferably, the restraining element 54 may be moved independently of the corrugating element 50.

After the first flexible sheet-terminal elements assembly 44 has been restrained, the corrugating element 52 deforms the second section of the restrained first flexible sheet-terminal elements assembly 44 to form at least one corrugation. The restraining action of the restraining element 54 eliminates unwanted movement of the first flexible sheet-terminal elements assembly 44 while the corrugation is formed, thereby assuring that corrugations will be formed regularly and uniformly.

After formation of the corrugation in the second section of the first flexible sheet-terminal elements assembly 44, the first section of the first flexible sheet-terminal elements assembly 44 is released from engagement to the second indentation 52. The first flexible sheet-terminal elements assembly 44 is moved so that an uncorrugated third section thereof is disposed in overlying relationship to the first indentation 48. A portion of the first flexible sheet-terminal elements assembly 44, and preferably the corrugated second section, is placed in overlying relationship to the second indentation 52, and is restrained as described above. The third section of the first flexible sheet-terminal elements assembly 44 then is corrugated as just described. This sequence of steps may be repeated for as many times as required to produce the necessary number of corrugations in the first flexible sheet-terminal elements assembly 44.

While it is preferred to form corrugations in the first flexible sheet-terminal elements assembly 44 with the corrugating element 50 and restraining element 54, other means of forming corrugations are likewise acceptable. For example, corrugations may be formed by contacting the first flexible sheet-terminal elements assembly 44 with a rotating gear member which forms the corrugations. Alternately, if the terminal elements are formed from a thermoplastic material, the corrugations may be formed in a high temperature oven, by use of conventional forming techniques.

With continued reference to FIGS. 1 and 2, a plurality of slits 56 are cut in the interior section 16 of the first flexible sheet-terminal elements assembly 44. These slits, which are preferably parallel, extend transversely and preferably perpendicularly to the first and second edge sections 12 and 14. Each adjacent pair of slits 56 defines an elongate ribbon element 58 disposed in the interior section 18 of the first flexible sheet-terminal elements assembly 44. Preferably, the ribbon elements 58 are characterized by identical lengths and widths.

The slits 56 preferably are formed by at least one, and preferably a plurality of cutting members (not shown) which are disposed in overlying relationship to the interior section 16 when the first flexible sheet-terminal elements assembly 44 is positioned on the template 46, or on some other restraining device, such as a jig. After the restraining element 54 has been lowered into the second indentation 52, the cutting member or members may contact the interior section 16 and cut at least one, and preferably a plurality of transversely extending slits therein. As succeeding sections of the first flexible sheet-terminal elements assembly 44 are positioned over the second indentation 52, one or more transversely extending slits 56 are cut in the interior section 16 of each such section of the first flexible sheet-terminal elements assembly 44. As will be discussed in greater detail hereafter, the slits 56 preferably coincide with the ridges 68 and grooves 70 formed in the terminal elements.

With continued reference to FIGS. 1 and 2, practice of the method just described results in production of a first flexible sheet-terminal elements assembly 44 having a plurality of adjacent corrugations formed in the terminal elements thereof, and having a plurality of adjacent transversely extending ribbon elements 58 formed in the interior section 16 thereof. As the corrugated, ribboned first flexible sheet-terminal elements assembly 44 is removed from the template 46, additional portions of the first flexible sheet 10 and terminal elements 20, 24, 32 and 38 may be simultaneously withdrawn from the spools on which they are rolled, and thereby may be made available for processing. The method is thus well-adapted to be practiced as a continuous process.

When the required number of corrugations have been produced in the corrugated, ribboned first flexible sheet-terminal elements assembly 44, a filtration module 62 is formed by severing the corrugated portion from the uncorrugated portion of the first flexible sheet-terminal elements assembly 44. If the lengths of the first flexible sheet 10 and terminal elements 20, 24, 32 and 38 have been preselected to produce a filtration module 62 of designated length, this severing step will not be required.

As best shown in FIGS. 3 and 4, the filtration module 62 comprises a first flexible sheet 10 having a first edge section 12, an opposed second edge section 14 and an interior section 16 intermediate to the first and second edge sections 12 and 14. Formed in the interior section 16 are a plurality of slits 56, which preferably are parallel, and which extend transversely, and preferably perpendicularly, to the first and second edge sections 12 and 14. Each pair of slits 56 define an elongate ribbon element 58. Preferably, the ribbon elements 58 are characterized by identical lengths and widths.

As discussed previously, the first and second surfaces of the corrugated terminal elements are characterized by alternating ridges 68 and grooves 70. Adjacent sections of each corrugated terminal element are preferably disposed in perpendicular relationship. Each slit 56 in the interior section 16 extends in overlying, parallel relationship to a ridge or groove formed in a first upper or lower terminal element 20 and 32, and extends in underlying, parallel, relationship to a ridge 68 or groove 70 formed in a second upper or lower terminal element 24 and 38. Preferably, each slit 56 extends in overlying, parallel relationship to grooves 70 in both the first upper and lower terminal elements 20 and 32, or to ridges 68 in both the first upper and lower terminal elements 20 and 32. Likewise, each slit 56 preferably in underlying, parallel relationship to grooves 70 in both the second upper and lower terminal elements 24 and 38, or to ridges 68 in both the second upper and lower terminal elements 24 and 38.

Further comprising the filtration module 62 is a first lower terminal element 20 having a corrugated first surface (not shown), and preferably a corrugated second surface (not shown). The first surface of the first lower terminal element 20 is disposed in surface-to-surface engagement with each portion of the first edge section 12 of the first flexible sheet 10. This engagement is maintained by a first lower retaining element 21, preferably comprising an adhesive layer, or mechanical compression fittings.

A second lower terminal element 24 preferably identical to the first upper terminal element 20 is characterized by a corrugated first surface (not shown) and preferably by a corrugated second surface 28. The second lower terminal element 24 is disposed in nested relationship to the first lower terminal element 20 and thus in surface-to-surface engagement with each portion of the first edge section 12. This engagement is maintained by a second lower retaining element 25, preferably comprising an adhesive layer or mechanical compression fittings. The first edge section 12 thus is laminated between the first and second lower terminal elements 20 and 24.

With continued reference to FIGS. 3 and 4, the filtration module 62 further comprises a first upper terminal element 32, preferably identical to the first and second lower terminal elements 20 and 24. The first upper terminal element 32 comprises a corrugated first surface 34 and preferably a corrugated second surface 36. The first surface of the first upper terminal element 32 is disposed in surface-to-surface engagement with each portion of the second edge section 14 of the first flexible sheet 10. This engagement is maintained by at least one second upper retaining element, preferably comprising mechanical compression fittings or a waterproof adhesive layer.

A second upper terminal element 38, preferably identical to the first upper terminal element 32, is characterized by a corrugated first surface 40, and preferably by a corrugated second surface 42. The second upper terminal element 38 is disposed in nested relationship to the first upper terminal element 32, and thus in surface-to-surface engagement with each portion of the second edge section 14. This engagement is maintained by at least one second upper retaining element (not shown), preferably comprising mechanical compression fittings or a waterproof adhesive layer. The second edge section 14 thus is laminated between the first and second upper terminal elements 32 and 38.

In the filtration module 62 just described, the ribbon elements 58 are disposed in the interior section 16 of the first flexible sheet 10. The terminal elements 20, 24, 32 and 38 are not disposed in overlying or underlying relationship to the interior section 16, and are thus positioned so as not to obstruct the interior section 16 and the ribbon elements 58.

With reference to FIGS. 3 and 4, the filtration module 62 is characterized by a first side 64 and an opposed second side 66. As discussed above, each of the sides 64 and 66 is preferably corrugated, and the corrugations formed in each side preferably comprise alternating ridges 68 and grooves 70, as shown in FIG. 4. Preferably the ridges 68 of each side 64 and 66 are positionable in coplanar relationship, and the grooves 70 likewise are positionable in coplanar relationship. Preferably, when the ridges 68 are positioned in coplanar relationship and the grooves 70 are likewise positioned in coplanar relationship, the respective planes of the ridges 68 and grooves 70 are disposed in parallel relationship to each other.

As shown in FIG. 3, planar projecting lug elements 72 are supported at both ends of each upper terminal element pair and at both ends of each lower terminal element pair. Preferably, the lug elements 72 are oriented in parallel relationship to the planes definable by the ridges 68 and the grooves 70. Each lug element 72 is preferably penetrated by a hole 73.

Figure 5:
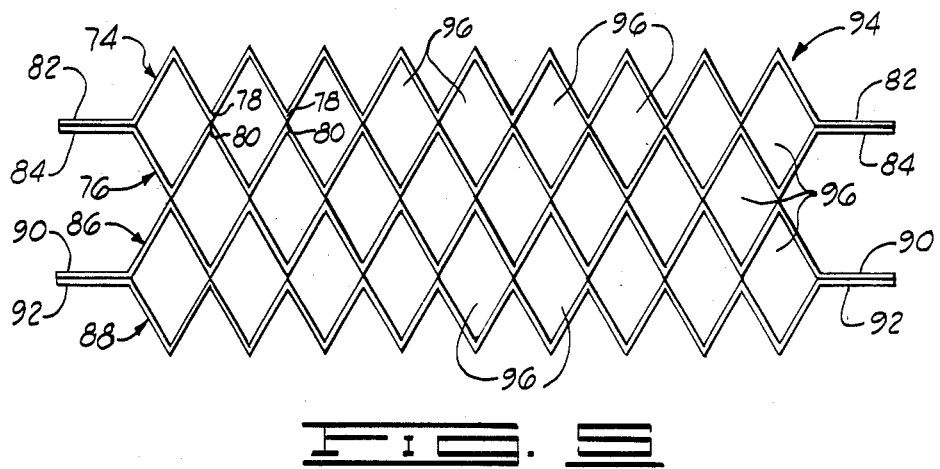
FIG. 5 is a semi-schematic view of the lower terminal section of four assembled filtration modules of the present invention.

Turning now to FIG. 5, a first filtration module 74 and an identical second filtration module 76 are assembled such that the ridges 78 of the first lower and upper terminal elements of the first filtration module 74 are positioned in ridge-to-ridge engagement with the respective ridges 80 of the first lower and upper terminal elements of the second filtration module 76. In this position, the lug elements 82 of the first filtration module 74 are positioned in surface-to-surface engagement with the lug elements 84 of the second filtration module 76.

If required, a third filtration module 86 is assembled such that the ridges of its second lower and upper terminal elements are disposed in ridge-to-ridge engagement with the respective ridges of the second lower and upper terminal element of the second filtration module 76. In like manner, a fourth filtration module 88 may be assembled such that the ridges of its first lower and upper terminal elements are disposed in ridge-to-ridge engagement with the respective ridges of the first lower and upper terminal elements of the third filtration module 86. When so assembled, the lug elements 90 of the third filtration module 86 are disposed in surface-to-surface engagement with the lug elements 92 of the fourth filtraton module 88. Additional filtration modules may be assembled in like manner.

In accordance with the method just described, a plurality of filtration modules may be stacked such that the ridges of the lower and upper terminal elements of each filtration module are disposed in ridge-to-ridge engagement with the respective ridges of the lower and upper terminal elements of an adjacent filtration module. The lug elements of alternate adjacent pairs of filtration modules are disposed in surface-to-surface relationship. The filtration modules may be held this configuration by means of an alignment assembly, which preferably comprises elongate rods (not shown) which extend through the collinear holes formed in the lug elements of each filtration module. Spacer elements (not shown) may be supported on the rods of the aligning assembly in order to maintain the filtration modules in stacked, spaced relationship, thus providing a rigid, unitary structure for the filter.

In another embodiment of the present invention, the terminal elements of the filtration modules may be coated with a monomer, which then is polymerized in situ to bind the filtration modules to each other in a stacked, spaced relationship and to maintain the filter in a rigid, unitary configuration. If the terminal elements are formed from a thermoplastic material, heat fusion and solvent fusion techniques may be used to accomplish the same result. Alternately, mechanical compression fittings may be used to bind together the terminal elements of adjacent filtration modules. Regardless of which binding method is used, the aligning assembly may be retained after binding to contribute additional rigidity to the filter.

With continued reference to FIG. 5, the lower terminal elements of the assembled filtration modules define a lower terminal section 94, having a grid-like array of openings formed therein. In like manner, the upper terminal elements of the assembled filtration modules (not shown in FIG. 5) define an upper terminal section having a grid-like array of openings formed therein. Because the filtration module and the terminal elements are preferably identical, each opening in the lower terminal section 94 corresponds to an opening formed in the upper terminal section. The upper terminal section may be disposed in overlying relationship to the lower terminal section 94, so that corresponding openings are disposed in overlying relationship.

A filter may be assembled from one or more filtration modules of the present invention by providing a housing (not shown) having an interior surface and an exterior surface. At least one, and preferably a plurality of filtration modules, assembled as described above, are disposed within the interior section of the housing. The upper and lower terminal sections of the stacked filtration modules are secured by connectors (not shown) to the interior surface of the housing. The upper and lower terminal sections are spaced within the housing at a distance sufficient to maintain a tension between the first and second edge sections of the first flexible sheet of each filtration module sufficient to keep each ribbon element in a fully extended, flexible state.

The housing preferably is disposed so as not to obstruct the openings formed in the upper and lower terminal sections of the stacked filtration modules, so that fluid may freely enter and leave these openings. Interconnecting each pair of corresponding openings in the upper and lower terminal elements is a channel (not shown) which is defined by the ribbon elements of the first flexible sheets. Fluid may flow into the filter through an opening in one terminal section, flow through one or more interconnecting channels to the other terminal section, and leave the filter through an opening in that terminal section.

Since the first flexible sheet can support the growth of a bacterial layer, the filter of the present invention may be used to process fluids, such as waste water, which contain bio-oxidizable solutes. In such an embodiment, the filter preferably is submerged, and fluid is permitted to flow between the terminal sections of the filter, so that fluid contacts bacteria growing on the ribbon elements of the filter. Nutrient material in the fluid is aerobically metabolized by the bacteria on the surface of the ribbon elements.

Because the ribbon elements of the filter are disposed in a flexible state, individual ribbon elements are flexed, and adjacent ribbon elements come into edgewise contact, as fluid is processed by the filter. This limited movement by the ribbon elements carries out a self-cleaning function, which prevents undesirable thickening of the bacterial layer on the ribbon elements.

If bacterial layers reach sufficient thicknesses on the first flexible sheet, conditions of anaerobic metabolism may be established adjacent the sheet surface. Such anaerobic conditions can result in production of unoxidized, unwanted chemical intermediates, and may prevent utilization of the entire surface of the ribbon elements for biological oxidation. By permitting limited movement of the ribbon elements during fluid processing, the present invention minimizes the excessive thickening of bacterial layers.

Figure 6:
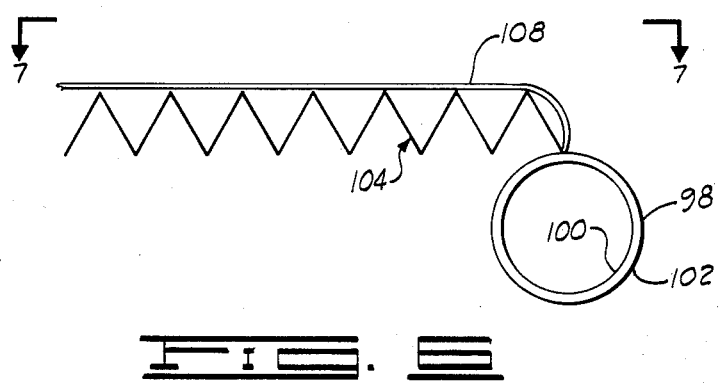
FIG. 6 is a semi-schematic side elevational view of the method of assembly of another type of filter using the filtration module of the present invention.

FIGS. 6 and 7 show the assembly of another embodiment of a filter of the present invention. Comprising the filter is a core, such as open-ended tube 98, which is preferably of cylindrical shape, and which is characterized by an internal surface 100 and an external surface 102. Further comprising the filter is at least one filtration module 104, which preferably is identical to that shown in FIGS. 3 and 4. Preferably, the distance between the upper and lower terminal elements of the filtration module 104 is less than or equal to the length of the tube 98. The terminal elements of the filtration module 104 are formed from a strong, flexible material. As discussed previously with reference to FIGS. 3 and 4, each of the terminal elements of the filtration module 104 is preferably characterized by a corrugated first surface and an opposed corrugated second surface. Each of the corrugated first and second surfaces is characterized by alternating ridges and grooves.

One edge of the filtration module 104 is coaxially engaged to the external surface 102 of the tube 98 by a connecting assembly (not shown), which preferably comprises mechanical compression fittings or a waterproof adhesive layer. Alternately, the filtration module 104 may be secured to the tube 98 by thermal binding.

The filter further comprises an uncorrugated first lower winding element 106, which preferably comprises a thin, elongate strip of strong, flexible material such as stainless steel, a polyamide such as nylon or fiberglass-reinforced plastic. The first lower winding element 106 engages the first lower terminal element (not shown) of the filtration module 104 at and adjacent the ridges of a selected one of the first and second surfaces thereof, shown as the second surface in FIG. 6. The first lower winding element 106 is preferably maintained in removable engagement with the filtration module 104. If desired, the end of the first lower winding element 106 adjacent the tube 98 may be secured to the external surface 102 of the tube 98, preferably by rivets or other mechanical connectors.

With reference to FIG. 7, the filter further comprises an uncorrugated first upper winding element 108, which preferably is identical to the first lower winding element 106. The first upper winding element 108 removably engages the first upper terminal element (not shown) of the filtration module 104 at and adjacent the ridges of a selected surface of the first upper terminal element, shown as the second surface in FIG. 6, such that the first lower and upper winding elements 106 and 108 are disposed on the same side of the flexible sheet of the filtration module 104. If desired, the end of the first upper winding element 108 adjacent the tube 98 may be secured to the external surface 102 of the tube 98, preferably by rivets or other mechanical connectors. The first lower and upper winding elements 106 and 108 preferably extend in parallel relationship.

As shown in FIG. 7, the filter preferably further comprises a second flexible sheet 110, which is preferably rectangular in shape and formed from the same material as the first flexible sheet. The second flexible sheet 110 comprises a first edge section, an opposed edge section, and an interior section 112 intermediate to the first and second edge sections. Formed in the interior section 112 are a plurality of slits 114 extending transversely to the first and second edge sections. Preferably, the slits 114 extend parallel to each other and perpendicularly to the first and second edge sections of the second flexible sheet 110. Each adjacent pair of slits defines a ribbon element 116.

Each portion of the first edge section of the second flexible sheet 110 is disposed in surface-to-surface engagement with the first lower winding element 106. Likewise, each portion of the second edge section of the second flexible sheet 110 is disposed in surface-to-surface engagement with the first upper winding element 108. Engagement of each edge section to its corresponding winding element is preferbly maintained by a retaining element (not shown) which preferably comprises a mechanical compression fitting or a waterproof adhesive layer. Alternately, thermal binding may be used to secure each edge section to its corresponding first winding element.

While it is preferred to provide a second flexible sheet 110 which is engaged with the upper and lower winding elements, it should be understood that a filter may also be assembled by use of the upper and lower winding elements alone, without provision of the second flexible sheet.

If a second flexible sheet 110 is provided, the filter preferably further comprises a second lower winding element (not shown), identical to the first lower winding element 106, and a second upper winding element (not shown), identical to the first upper winding element 108. The second lower winding element is disposed in surface-to-surface engagement with each portion of the first edge section of the second flexible sheet 110, such that the first edge section is laminated between the first and second lower winding elements. In like manner, the second upper winding element is disposed in surface-to-surface engagement with each portion of the second edge section of the second flexible sheet 110, such that the second edge section is laminated between the first and second upper winding elements. Engagement between the second upper and lower winding elements and the second flexible sheet is preferably maintained by mechanical compression fittings or a waterproof adhesive layer. Alternately, thermal binding may be used to secure each edge section to its corresponding second winding element.

FIG. 8 shows the filter shown in FIGS. 6 and 7 in a later stage of assembly. The filtration module-winding elements structure is spirally wound around the external surface 102 of the tube 98, and thus around the axis of the tube 98. Successive windings of the filtration module 104 are maintained in spaced, adjacent relationship by intervening windings of the first lower and upper winding elements 106 and 108, which respectively engage the lower and upper terminal elements of the filtration module 104. Winding of the filtration module-winding elements structure in this way forms an approximately cylindrical structure having alternating layers of winding elements and terminal elements. Because the winding elements are removably engaged to the terminal elements of the filtration module 104, limited relative slippage between the filtration module 104 and the winding elements is possible during assembly.

In the embodiment shown in the Figures, the tube 98 is shown as having a circular cross-section. However, the tube 98 may have other cross-sections. For example, the tube 98 may be formed with a stepwise discontinuity adjacent the point of attachment of the filtration module to the tube 98, so that the second winding of the filtration module will overlay the first winding in flush relationship.

If required, an additional unassembled filtration module-winding elements structures may be secured to the free edge of the assembled filtration module-winding elements structure, and wound around the axis of the tube 98 as just described. Additional filtration module-winding elements structure may be incorporated into the filter in like manner until an assembled filtration module-winding elements structure of the required diameter is formed.

After the winding of the filtration module or modules 104 and the winding elements 106 and 108 about the tube 98 is complete, the terminal elements and winding elements structure may be coated with a monomer, which then is polymerized in situ, thereby binding the structure into a rigid, tightly coiled configuration. Alternately, the filter may be held in a rigid, tightly coiled configuration by mechanical means, such as adhesion or compression, or by both mechanical and chemical means, such as polymerization.

With reference to FIG. 9, the filter of the present invention, generally designated by reference numeral 117, preferably further comprises a housing 118, preferably comprising an open-ended cylinder having an interior surface 120 and an exterior surface 122. The assembled filtration module-winding elements structure, generally designated by reference numeral 124, is disposed within the housing 118, in coaxial relationship thereto, such that the tube 98 extends coaxially within the housing 118.

As best shown in FIGS. 8 and 9, the lower terminal elements and the lower winding elements of the assembled filtration module-winding elements structure define a lower terminal section 126 having a grid-like array of openings 128 formed therein. In like manner, the upper terminal elements and upper winding elements of the assembled filtration module-winding elements structure define an upper terminal section 130 (shown in FIG. 9) having a grid-like array of openings formed therein. Each opening in the upper terminal section 130 corresponds to an opening formed in the lower terminal section 126.

As shown in FIG. 9, the lower and upper terminal sections 126 and 130 of the assembled filtration module-winding elements structure 124 are secured by connectors (not shown) to the interior surface 120 of the housing 118. The lower and upper terminal sections 126 and 130 are spaced within the housing 118 at a distance sufficient to maintain a tension between the first and second edge sections of the first and second flexible sheets sufficient to keep each ribbon element 132 in a fully extended, flexible state.

The housing 116 is disposed in non-obstructing relationship to the openings formed in the upper and lower terminal sections of the stacked filtration modules, so that fluid may freely enter and leave these openings. Interconnecting each pair of corresponding openings in the upper and lower terminal elements is a channel (not shown) which is defined by the ribbon elements 132 of the first flexible sheets. Fluid may flow into the filter through an opening in one terminal section, flow through one or more interconnecting channels to the other terminal section, and leave the filter through an opening in that terminal section.

The upper end of the housing 118 preferably extends above the upper terminal section 130 of the filtration module-winding elements assembly 124. This permits the filtration module-winding elements assembly 124 to be submerged in a fluid 134 to be processed in the filter 114. As shown in FIG. 9, fluid 134 may be drawn through tube 98 to the upper portion of the filter 117 by a pump 136, which preferably comprises an aerator. The fluid 134 may then be drawn by gravity through the opening formed in the upper terminal section 130, and then into the channels and into contact with the ribbon elements 132. Filtered fluid may leave the filter 117 through the openings 128 formed in the lower terminal section 126.

Changes may be made in the construction and operation of the various parts, elements and assemblies described herein, and in the operation of the steps of the method described herein, without departing from the spirit and scope of the invention as defined in the following claims.

What is claimed is:

1. A filter comprising:
   a housing having an interior surface and an exterior surface;
   at least one filtration module supported within the housing, comprising:
     a first flexible sheet, comprising:
       a first edge section;
       an opposed second edge section; and
       an interior section intermediate to the first and second edge sections, the interior section having a plurality of slits extending transversely to the edge sections, each adjacent pair of slits defining a ribbon element, each ribbon element disposed in a fully extended, flexible state;
     a first lower terminal element having a corrugated first surface disposed in surface-to-surface engagement with each portion of the first edge section of the first flexible sheet; and
     a first upper terminal element having a corrugated first surface disposed in surface-to-surface engagement with each portion of the second edge section of the first flexible sheet.

2. The filter of claim 1 further comprising:
   a second lower terminal element, identical to the first lower terminal element, disposed in surface-to-surface engagement with each portion of the first edge section, such that the first edge section is laminated between the first and second lower terminal elements; and
   a second upper terminal element, identical to the second lower terminal element, disposed in surface-to-surface engagement with each portion of the second edge section, such that the second edge section is laminated between the first and second upper terminal elements.

3. The filter of claim 1 in which the first upper and lower terminal elements are disposed in non-obstructing relationship to the interior section of the first flexible sheet.

4. Ther filter of claim 1 in which the first surface of each of the first upper and lower terminal elements is characterized by alternating ridges and grooves and in which each slit in the interior section extends in overlying relationship to a ridge or groove of a first upper or lower terminal element.

5. The filter of claim 4 in which each slit of the interior section extends in overlying relationship to grooves of both the first upper and lower terminal elements or to ridges of both the first upper and lower terminal elements.

6. The filter of claim 1 in which each of the first upper and lower terminal elements is characterized as having a corrugated second surface, opposed to the first surface, and in which each of the first and second surfaces has alternating ridges and grooves, and further comprising:
   an uncorrugated first lower winding element engaging the first lower terminal element at and adjacent the ridges of a selected one of the first and second surfaces thereof; and
   an uncorrugated first upper winding element engaging the first upper terminal element at and adjacent the ridges of a selected surface thereof, such that the first upper and lower winding elements are disposed on the same side of the first flexible sheet.

7. The filter of claim 6, further comprising:
   a second flexible sheet comprising:
     a first edge section;
     an opposed second edge section; and
     an interior section intermediate to the first and second edge sections, the interior section having a plurality of slits extending transversely to the edge sections, each adjacent pair of slits defining a ribbon element;
   in which each portion of the first edge section of the second flexible sheet is disposed in surface-to-surface engagement with the first lower winding element, and in which each portion of the second edge section of the second flexible sheet is disposed in surface-to-surface engagement with the first upper winding element.

8. The filter of claim 6 in which the filtration module-winding elements assembly is spirally wound around an axis to form a structure having alternating layers of winding elements and terminal elements.

9. The filter of claim 8 in which the filtration module is coaxially wound around an open-ended tube.

10. The filter of claim 1, further comprising identical first and second filtration modules, in which the first surfaces of the filtration modules are characterized by alternating ridges and grooves, and in which the filtration modules are disposed such that the first lower terminal elements of the respective filtration modules are positioned in ridge-to-ridge engagement and such that the second lower terminal elements of the respective filtration modules are positioned in ridge-to-ridge engagement.

11. A filter module comprising:
    a first flexible sheet, comprising:
      a first edge section;
      an opposed second edge section; and
      an interior section intermediate to the first and second edge sections, the interior section having a plurality of slits extending transversely to the edge sections, each adjacent pair of slits defining a ribbon element;
    a first lower terminal element having a corrugated first surface disposed in surface-to-surface engagement with each portion of the first edge section of the first flexible sheet; and a first upper terminal element having a corrugated first surface disposed in surface-to-surface engagement with each portion of the second edge section of the first flexible sheet.

12. The filter module of claim 11, further comprising:
a second lower terminal element, identical to the first lower terminal element, disposed in surface-to-surface engagement with each portion of the first edge section, such that the first edge section is laminated between the first and second lower terminal elements; and
a second upper terminal element, identical to the second lower terminal element, disposed in surface-to-surface engagement with each portion of the second edge section, such that the second edge section is laminated between the first and second upper terminal elements.

13. The filter module of claim 11 in which the first upper and lower terminal elements are disposed in non-obstructing relationship to the interior section of the first flexible sheet.

14. The filter module of claim 11 in which the first surface of each of the first upper and lower terminal elements is characterized by alternating ridges and grooves and in which each slit in the interior section extends in overlying relationship to a ridge or groove of a first upper or lower terminal element.

15. The filter module of claim 14 in which each slit of the interior section extends in overlying relationship to grooves of both the first upper and lower terminal elements or to ridges of both the first upper and lower terminal elements.

16. The filter module of claim 11 in which each lower terminal element is characterized as having a corrugated second surface, opposed to the first surface, and in which each of the first and second surfaces has alternating ridges and grooves, and further comprising:
an uncorrugated first lower winding element engaging the first lower terminal element at and adjacent the ridges of a selected one of the first and second surfaces thereof; and
an uncorrugated first upper winding element engaging the first upper terminal element at and adjacent the ridges of a selected surface thereof, such that the first upper and lower winding elements are disposed on the same side of the first flexible sheet.

* * * * *

UNITED STATES PATENT AND TRADEMARK OFFICE
CERTIFICATE OF CORRECTION

PATENT NO. : 4,555,342

DATED : Nov. 26, 1985

INVENTOR(S) : Blake F. Grant

It is certified that error appears in the above-identified patent and that said Letters Patent is hereby corrected as shown below:

Col. 2, line 62, "sheetlower" should be --sheet-lower--.

Col. 6, line 26, delete the word "greater" as per the Amendment filed March 20, 1985.

Col. 13, claim 4, line 1, "Ther" should be --The--.

Signed and Sealed this

Eleventh Day of March 1986

[SEAL]

Attest:

DONALD J. QUIGG

Attesting Officer

Commissioner of Patents and Trademarks